United States Patent [19]
Heywood et al.

[11] Patent Number: 5,926,960
[45] Date of Patent: *Jul. 27, 1999

[54] HEDGE SHEARS

[75] Inventors: Peter Heywood, Filderstadt; Helmut Achtzehnter, Stuttgart; Klaus Schoen, Altbach, all of Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/645,482

[22] Filed: May 13, 1996

[30] Foreign Application Priority Data

Jun. 28, 1995 [DE] Germany ............................ 195 22 970

[51] Int. Cl.⁶ ...................................................... A01G 3/04
[52] U.S. Cl. ............................................... 30/216; 30/228
[58] Field of Search ............................ 30/210, 216, 228, 30/380, 382, 383

[56] References Cited

U.S. PATENT DOCUMENTS

| | | | |
|---|---|---|---|
| 4,378,637 | 4/1983 | Kieser et al. | 30/216 |
| 4,817,291 | 4/1989 | Stehle | 30/381 |
| 5,150,523 | 9/1992 | McCurry | 30/228 |
| 5,653,030 | 8/1997 | Yokoyama et al. | 30/216 |
| 5,689,887 | 11/1997 | Heywood et al. | 30/216 |

FOREIGN PATENT DOCUMENTS

| | | |
|---|---|---|
| 0214455 | 10/1989 | European Pat. Off. . |
| 2291744 | 1/1996 | United Kingdom . |

*Primary Examiner*—Hwei-Siu Payer
*Attorney, Agent, or Firm*—Michael J. Striker

[57] ABSTRACT

A hedge shears has a housing with two handles provided each with an actuating button for turning on and off the hedge shear during two-hand operation. The handle for holding the hedge shears and the handle for guiding the hedge shear are formed so that the handle for holding is T-shaped and has a longitudinal member and a transverse member to form three gripping legs, wherein two gripping legs are bent downwardly.

9 Claims, 1 Drawing Sheet

HEDGE SHEARS

BACKGROUND OF THE INVENTION

The present invention relates generally to a hedge shears.

Hedge shears are known in the art. One of the known hedge shears is disclosed for example in the European patent document EP 0 214 455. The hedge shears disclosed in this reference have two handles. Their second handle which is closer to the central gravity is ring shaped and extends laterally and upwardly over the housing contour of the hedge shears. Also, a separate, two-shell part is screwed on the housing and carries several buttons for actuation of a microswitch. Thereby the production and mounting of the hedge shears are relatively expensive. Moreover, the bracket handle forms a substantial additional weight for the hedge shears and also makes them more expensive.

SUMMARY OF THE INVENTION

Accordingly, it is an object of the present invention to provide a hedge shears which avoids the disadvantages of the prior art.

In keeping with these objects and with others which will become apparent hereinafter, one feature of the present invention resides, briefly stated, in a hedge shears in which the handles for holding the hedge shears extend longitudinally as a T-shaped post and forwardly a transverse beam is connected with the same, and the T-post together with the transverse beam form three handle legs including two handle legs of the transverse beam which extend sideways and are bent downwardly.

When the hedge shears are designed in accordance with the present invention, they have the advantage that the second handle is completely integrated in the housing, and the manufacture, support and mounting of an additional part for the handle is dispensed with. Therefore the manufacture and costs are substantially lower than in conventional hedge shears. Moreover, the inventive hedge shears are lighter and easier to handle. The handle provides for the operator substantially the same number of gripping positions as in the known hedge shears with expensive bracket handles.

A special advantage of the present invention is that the bottom switching is operated especially ergonomically. The switching lever of the switch can be reached in predetermined positions of the holding hand both with the hand ball as well as with the fingers since the switching lever extends above the handle over it and also the actuation button operable from above downwardly is provided.

In accordance with another feature of the present invention the handle is at least partially a one-piece part of the housing. The housing can be longitudinally subdivided into two half shells and the handle can be also longitudinally subdivided, so that each gripping leg of the transverse beam belongs one half shell. The handle can have an upwardly open hollow profile. In this case the switching lever can be guided in the hollow profile of the handle so as to close the hollow profile and to form an operating button. The operating button can extend upwardly beyond the contour of the handle and arranged movably relative to it.

In accordance with further features of the present invention, the operating buttons include three button regions corresponding to the gripping legs of the handle. The operating button is formed as a tilting button with a tilting axis at the end of the T-shaped post at the side of the housing which is opposite to the transverse beam of the handle. The contour of the operating button can merge into the housing.

The operating button can be guided in the handle, in particular in its hollow profile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
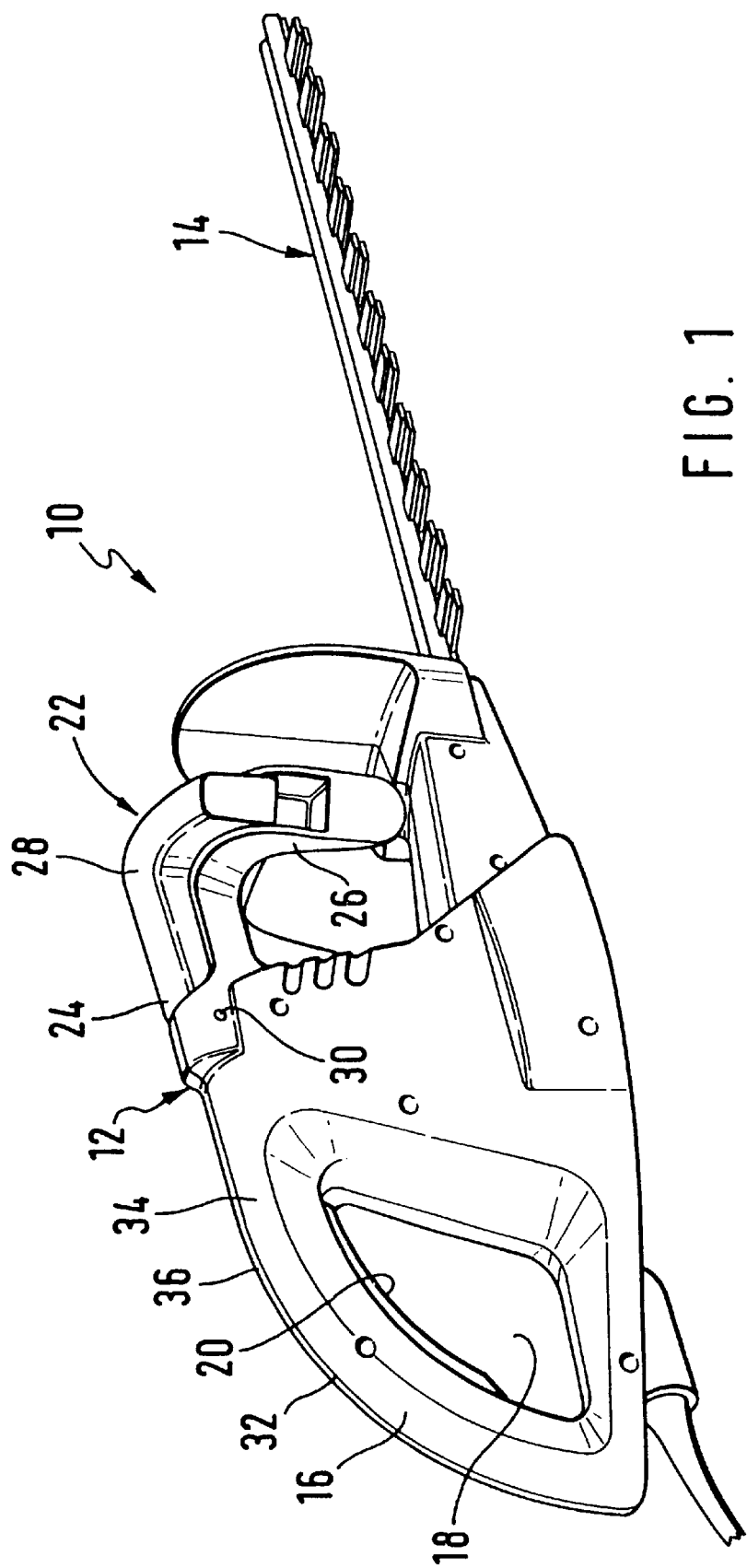
FIG. 1 is a side view of a hedge shears in accordance with the present invention.

The inventive hedge shears shown in FIG. 1 and identified with reference numeral 10 has a housing 12. A hedge shear cutter 14 which is shown schematically extends outwardly of the housing. The housing 10 at the side facing away from the hedge shear cutter 14 have a rear handle 16 which forms together with the housing 12 a closed, oval engagement opening 18.

The handle 16 carries a switching button 20 on its lower side for turning on and off the drive of the hedge shears. The button 20 is displaceable relative to the handle 16 transversely to its contour and is depressible in the handle and extendable from it.

The upper contour of the housing 12 extends from the C-shaped handle 16 forwardly and ends in a second handle 22. The second handle is composed of a bar-shaped, longitudinally extending T-post 24 which longitudinally and forwardly merges into a transverse beam 26. Both ends of the transverse beam 26 are bent downwardly at their sides. The transverse beam 26 and the housing 12 are arranged so a distance provided between has sufficient space for the hand of the operator.

The handle 22 at its upper side has a T-shaped actuating button 28 which follows and transverse contour of the handle 22. The operating button 28 is tiltable downwardly relative to the handle 22 about a tilting axis 30 located in the upper region of the housing 12 near the exit of the T-post 24. The operating button 28 extends into the interior of the housing 12 with its sides facing away from the transverse beam 26. Therefore it can be coupled by a not shown actuating means with a microswitch.

Only when both members, in particular the switching button 20 and the actuating button 28 are simultaneously depressed the hedge shears 10 is ready for operation. When one of the buttons 20, 28 is released, the operation of the hedge shear stops momentarily.

The drawings illustrates the gripping possibilities on the transverse beam 26. The downwardly bent sides of the transverse beam 26 of the handle 22 and the actuating button 28 arranged on the upper side of the handle 22 are clearly seen in the drawing. The actuating button 28 can be depressed into the handle 22. Moreover, a separating joint 32 separates the housing 12 of the hedge shears 10 into longitudinally connected half shells 34, 36. The handle 22 belongs in half to each of the half shells 34, 36.

When the hand of the operator engages on the handle 22, it can depress the actuating button 28 with its thumb. This position is especially advantageous for vertical cutting of fences.

When the operator's hand engages from above the handle 22, he can depress with its hand the actuating button 28 while the operator stands over the cutting edge of the fence. This position is especially advantageous for horizontal fence cuts.

In certain conditions it can be also advantageous to engage the T-post 24 of the handle 22 with the operator's hand and operate in this position, when it is more convenient to operate than the gripping position with both gripping legs.

It is to be clear that the T-shaped, curved front handle 22 corresponds in its versatility with handling of extensive bracket handles.

It will be understood that each of the elements described above, or two or more together, may also find a useful application in other types of constructions differing from the types described above.

While the invention has been illustrated and described as embodied in a hedge shear, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Hedge shears, comprising a housing; a hedge shear cutter extending forwardly from said housing; two handles each provided with a switching lever and formed so that one of said handles is used for holding and the other of said handles is used for guiding the hedge shears, said switching levers being formed to switch on and off of a hedge shear drive and for two-hand handling and operating the hedge shears, said handles including a first handle provided for holding the hedge shears and is formed with a T-post with an elongated member and a transverse member so as to form three gripping legs, two of the three gripping legs being formed by said transverse member and extending laterally so as to be bent downwardly, said first handle having an upwardly open hollow profile.

2. Hedge shears as defined in claim 1, wherein said first handle is formed as an element which is integral with said housing.

3. Hedge shears as defined in claim 2, wherein said housing is subdivided into two half shells, said first handle being also longitudinally separated so that each gripping leg of said transverse member belongs to a respective one of said half shells.

4. Hedge shears as defined in claim 1, wherein said switching lever of said first handle is guided in said hollow profile so as to close said hollow profile from above and form a T-shaped actuating button with laterally downwardly bent ends.

5. Hedge shears as defined in claim 4, wherein said actuating button extends outwardly beyond a contour of said first handle and is movable downwardly relative to said first handle.

6. Hedge shears as defined in claim 5, wherein said actuating button of said first handle has three button regions corresponding to said legs of said first handle.

7. Hedge shears as defined in claim 4, wherein said actuating button of said first handle is formed as a tilting button with a tilting axis arranged at an end of said elongated member in said housing at the side facing away from said transverse member of said first handle.

8. Hedge shears as defined in claim 4, wherein said actuating button of said first handle has a contour which merges into a contour of said housing.

9. Hedge shears as defined in claim 4, wherein said actuating button is guided in said hollow profile of said first handle.

* * * * *